US008232854B2

(12) United States Patent
Greenway

(10) Patent No.: US 8,232,854 B2
(45) Date of Patent: Jul. 31, 2012

(54) TARGET MAGNET MOUNTING SYSTEM

(75) Inventor: Warren Greenway, Pahoa, HI (US)

(73) Assignee: Royne Industries, LLC, La Jolla, CA (US)

( * ) Notice: Subject to any disclaimer, the term of this patent is extended or adjusted under 35 U.S.C. 154(b) by 220 days.

(21) Appl. No.: 12/749,465

(22) Filed: Mar. 29, 2010

(65) Prior Publication Data

US 2010/0245003 A1 Sep. 30, 2010

Related U.S. Application Data

(60) Provisional application No. 61/165,459, filed on Mar. 31, 2009.

(51) Int. Cl.
*H01F 3/00* (2006.01)
*F16M 11/00* (2006.01)

(52) U.S. Cl. ........ 335/303; 335/153; 335/205; 248/200; 248/205.1; 248/208; 248/226.11; 248/227.1; 200/61.81

(58) Field of Classification Search .................. 248/200, 248/208, 205.1, 226.11, 227.1, 300–301, 248/339; 335/151–153, 205–208; 200/61.81, 200/293.1, 295, 43.21
See application file for complete search history.

(56) References Cited

U.S. PATENT DOCUMENTS

| | | | | |
|---|---|---|---|---|
| 3,417,354 | A * | 12/1968 | Wenner et al. | 335/205 |
| 3,584,823 | A * | 6/1971 | Andrew et al. | 248/164 |
| 4,051,916 | A * | 10/1977 | Oda | 180/90 |
| 4,327,264 | A * | 4/1982 | Botz et al. | 200/295 |
| 5,198,789 | A * | 3/1993 | Taylor | 335/132 |
| 5,253,836 | A * | 10/1993 | Tso | 248/226.11 |
| 5,877,664 | A | 3/1999 | Jackson, Jr. | |
| 5,929,731 | A | 7/1999 | Jackson, Jr. | |
| 6,491,271 | B1 * | 12/2002 | Adams | 248/206.5 |
| 7,187,259 | B1 * | 3/2007 | Habboosh | 335/205 |
| 7,199,688 | B2 * | 4/2007 | Edmonson, Jr. | 335/207 |
| 7,248,136 | B2 | 7/2007 | Habboosh | |
| 7,486,509 | B2 * | 2/2009 | Kim et al. | 361/679.34 |
| 7,944,334 | B2 * | 5/2011 | Woods | 335/205 |

* cited by examiner

*Primary Examiner* — Mohamad Musleh
(74) *Attorney, Agent, or Firm* — Philip R. M. Hunt; Kurt M. Rylander

(57) ABSTRACT

An embodiment is a target magnet mounting system including a magnet housing having first and second sets of spring clip mounting hooks on opposing sides of the housing and first and second spring clips mountable to the first and second spring clip mounting hook sets, respectively. Each of the spring clips includes a flexible strip having opposing first and second ends, each of the first and second ends including serrated teeth. The target magnet mounting system may be inserted into a channel to detachably engage the sidewalls of the channel to position a target magnet.

10 Claims, 2 Drawing Sheets

TARGET MAGNET MOUNTING SYSTEM

CROSS-REFERENCE TO RELATED APPLICATION

This application claims priority to U.S. Provisional Patent Application Ser. No. 61/165,459 filed Mar. 31, 2009, which is incorporated herein by reference.

FIELD OF THE INVENTION

The present invention relates to magnetic security switches. More particularly, the present invention relates to mounting systems for mounting target magnets for magnetic security switches.

BACKGROUND

Magnetic security switches use the detection of a magnetic field, or loss of detection of a magnetic field, to indicate that a door, window or other enclosure access has been opened. In its simplest form, a magnetic security switch uses permanent magnet (referred to herein as a "target magnet") mounted to an enclosure access, e.g. a door to a room, and a magnetic sensor, such as a reed switch, acting as a switch to detect the presence or absence of the target magnet. If the magnet is detected, then the door is in the expected position. If no magnet is detected, then the door is not in the expected position. This go/no-go signal can be used as an input to an alarm system, automatic monitoring systems, or safety interlocks.

The effectiveness of the security switch is directly affected by the alignment of the target magnet to the detector switch when the door is in the expected position—if the target magnet is not within the detector switch's reliable detection range when the door is in the expected position then the detector switch will incorrectly indicate that the door is not in position. The converse is also true—a misaligned target magnet may inadvertently be within the detection range of the detector switch when the door is not in the expected position and therefore incorrectly indicate that the door is in position (e.g. a partially closed door indicated as fully closed).

External mounting of target magnets leaves them vulnerable to tampering, therefore it is preferable to mount the target magnet inside the door itself. Generally, a U-channel is formed into or machined into a door edge and the target magnet is mounted inside this U-channel. Existing devices for mounting target magnets into door U-channels involve either screwing mounting brackets into the U-channel, or using adhesives such as epoxy to permanently set the target magnet in place. Adjustments to ensure proper alignment with the detector switch are labor intensive and therefore expensive, and generally the installation location is essentially permanent—especially where adhesives are used. Subsequent modifications to the mounting location are equally labor intensive, and may require destructive removal of the target magnet. For installations in secure buildings, where hundreds of doors and windows may require magnetic security switches, even small improvements in the time and skill required for installation will yield substantial cost savings.

Thus, there is a need for a target magnet mounting system which is: (1) quick to install; (2) easily aligned; (3) inexpensive to manufacture; (4) easily changed; and (5) compatible with existing security switch systems.

SUMMARY AND ADVANTAGES

A target magnet mounting system includes a magnet housing having first and second sets of spring clip mounting hooks on opposing sides of the housing; and, first and second spring clips mountable to the first and second spring clip mounting hook sets, respectively, each of the spring clips comprising a flexible strip having opposing first and second ends, each of the first and second ends including serrated teeth. A target magnet mounting system includes wherein the magnet housing comprises opposing first and second sections, the first and second sections forming a magnet cavity when mated together. A target magnet mounting system includes a target magnet within the magnet housing.

The target magnet mounting system of the present invention presents numerous advantages, including: (1) quick to install; (2) easily aligned; (3) inexpensive to manufacture; (4) easily changed; and (5) compatible with existing security switch systems and doors.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A target magnet mounting system is provided and includes a magnet housing having first and second sets of spring clip mounting hooks on opposing sides of the housing; and, first and second spring clips mountable to the first and second spring clip mounting hook sets, respectively, each of the spring clips comprising a flexible strip having opposing first and second ends, each of the first and second ends including serrated teeth. A target magnet mounting system includes wherein the magnet housing comprises opposing first and second sections, the first and second sections forming a magnet cavity when mated together. A target magnet mounting system includes a target magnet within the magnet housing.

Figure 3:
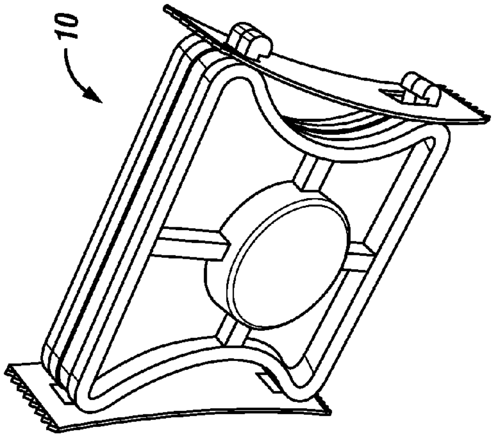
FIG. 3 shows a perspective view of a target magnet mounting system.
Figure 2:
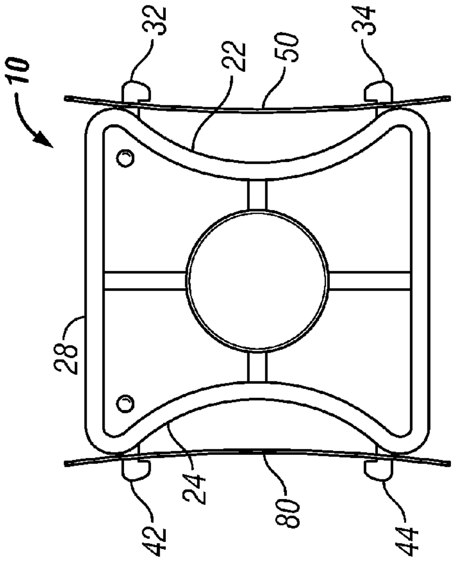
FIG. 2 shows a plan view of a target magnet mounting system.
Figure 1:
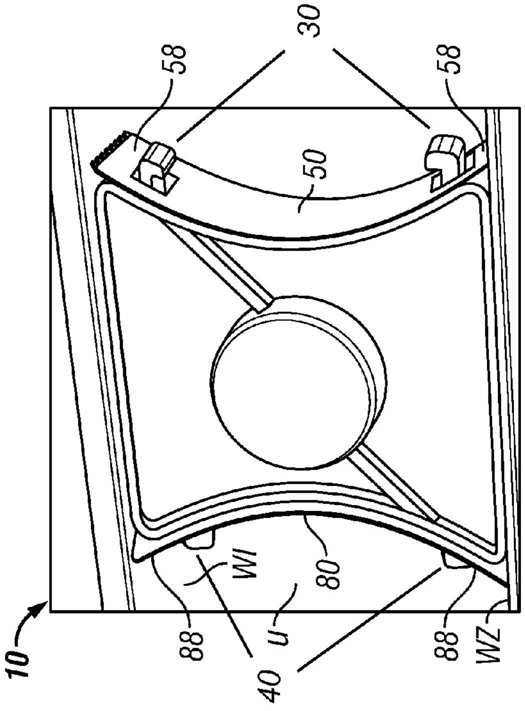
FIG. 1 shows a target magnet mounting system installed in a U-frame.
Figure 4:
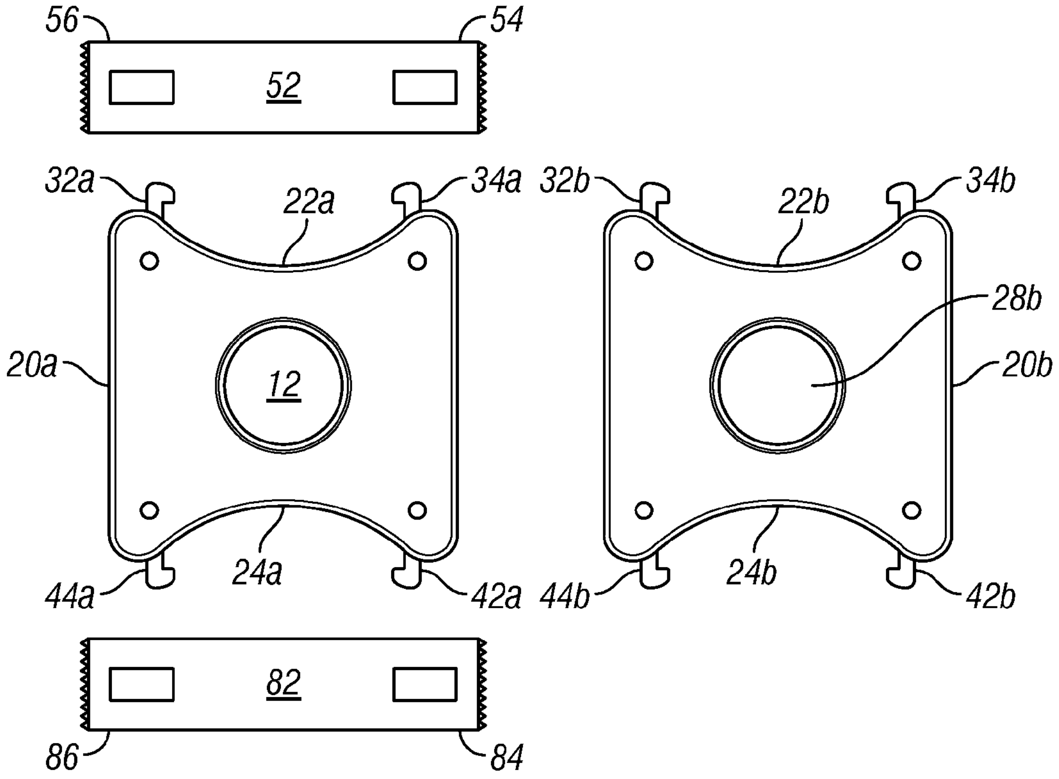
FIG. 4 shows an exploded view of a target magnet mounting system.
Figure 5:
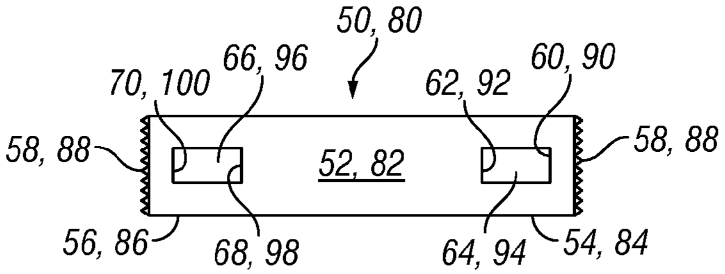
FIG. 5 shows an plan view of a spring clip.

Referring to FIGS. 1-4, a target magnet mounting system 10 is shown and includes a magnet housing 20 having first and second sets of spring clip mounting hooks 30 and 40, respectively, on opposing sides 22 and 24 of the housing 20. In the disclosed embodiment, mounting hook sets 30 and 40 are paired sets of facing hooks 32, 34 and 42, 44, projecting outwardly from housing 20. Housing sides 22 and 24 are indented to accommodate displacement of spring clips 50 and 60. Target magnet 12 is retained in cavity 28 within housing 20.

In the disclosed embodiment, housing 20 is assembled from identical opposing first and second sections 20*a* and 20*b*. First and second housing sections 20*a* & *b* include corresponding parts labeled "a" and "b" in the figures. First and second housing sections 20*a* & *b* snap together around target magnet 12.

First and second spring clips 50 and 80, respectively, are mountable to the first and second spring clip mounting hook sets 30 and 40, respectively. In the disclosed embodiment the spring clips 50 and 80 are identical. Each spring clip 50, 80, includes a flexible strip, 52, 82, having first 54, 84, and second 56, 86, ends, each of the first and second ends including serrated teeth 58, 88. Each spring clip 50, 80 includes mounting slots 60, 66 and 90, 96, respectively, proximal to their first and second ends 54, 56 and 84, 86, respectively. In the disclosed embodiment spring clips 50, 80 are made from stainless steel.

Mounting slot 60 includes inner edge 62 and outer edge 64. Mounting slot 66 includes inner edge 68 and outer edge 70. Mounting slot 90 includes inner edge 92 and outer edge 94. Mounting slot 96 includes inner edge 98 and outer edge 100.

The inner edges 62, 68 and 92, 96 of spring clips 50 and 80 are spaced from each other to lightly engage inward facing mounting hooks 32, 34 and 42, 44 when spring clips 50 and 80 are relaxed to ensure they are retained in place, yet still providing easy assembly.

In operation, a target magnet mounting system 10 is assembled by snapping together first and second housing sections 20*a* & *b* around a target magnet 12. First and second spring clips 50 and 80 are then mounted onto mounting hooks 32, 34 and 42, 44 on opposing sides 22 and 24 of housing 20. To install into a door U-channel U, spring clips 50 and 80 are squeezed together, thereby displacing into indented sides 22 and 24 and drawing together their ends with serrated teeth 58 and 88. The mounting system 10 is then inserted into the U-channel U and the spring clips 50 and 80 are released. When spring clips 50 and 80 are released they expand against the sidewalls W1 and W2 of the U-channel so that serrated teeth 58, 88 grip the walls and the target magnet is maintained in position.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A target magnet mounting system, comprising a magnet housing including first and second sets of spring clip mounting hooks on opposing sides of said housing; and, first and second spring clips mountable to said first and second spring clip mounting hook sets, respectively, each of said spring clips comprising a flexible strip having opposing first and second ends, each of said first and second ends including serrated teeth, the first spring clip and the second spring clip when released away from detents mounted in the magnet housing to extend to detachably engage the target magnet mounting system in a channel.

2. A target magnet mounting system as in claim 1, further comprising:

wherein said magnet housing comprises opposing first and second sections, said first and second sections forming a magnet cavity when mated together.

3. A target magnet mounting system as in claim 1, further comprising:

a target magnet within said magnet housing.

4. A target magnet mounting system as in claim 1, the magnet housing further comprising:

a first detent formed in the magnet housing adjacent the first spring clip; and a second detent formed in the magnet housing adjacent the second spring clip; and the first spring clip and the second spring clip to depress into the first detent and the second detent respectively to insert the target magnet mounting system into the channel.

5. A target magnet mounting system as in claim 1, the first spring clip and the second spring clip to detachably engage the target magnet mounting system in the channel by detachably engaging the plurality of serrated teeth with the sidewalls of the channel.

6. A target magnet mounting system as in claim 1, the channel further comprising a u-shaped channel, a door channel, a wall channel, a window channel, or a combination thereof.

7. A target magnet mounting system, comprising a magnet housing including a first pair of spring clip mounting hooks and a second pair of spring clip mounting hooks extending from opposing sides of the magnet housing; and, a first spring clip and a second spring clip detachably engaged to the first pair of spring clip mounting hooks and the second pair of spring clip mounting hooks, respectively, the first spring clip and the second spring clip each including a flexible strip having a plurality of serrated teeth formed at each end of the flexible strip, the first spring clip and the second spring clip when released away from detents mounted in the magnet housing to extend to detachably engage the target magnet mounting system in a channel.

8. A target magnet mounting system as in claim 7, the magnet housing further comprising a first section and a second section opposing the first section, said first section and the second section defining a magnet cavity when mated together.

9. A target magnet mounting system as in claim 8, further comprising a target magnet disposed within the magnet cavity.

10. A target magnet mounting system as in claim 9, the target magnet to at least in part actuate a security system.

* * * * *